United States Patent Office 2,749,271
Patented June 5, 1956

2,749,271

1,4,5,8 - TETRAOXAOCTAHYDRONAPHTHALENE-DITHIOL S,S-BIS(O,O-DIALKYL PHOSPHORODITHIOATES) AND INSECTICIDAL COMPOSITIONS CONTAINING THE SAME

George Allen Buntin, Wilmington, Del., assignor to Hercules Powder Company, Wilmington, Del., a corporation of Delaware No Drawing. Application December 30, 1954,
Serial No. 478,892

10 Claims. (Cl. 167—33)

This invention relates to new and useful organic dithiophosphate compounds and to pesticidal compositions containing the same.

The novel organic dithiophosphate compounds of this invention have the general formula

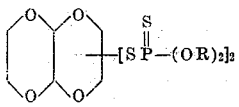

in which each R represents a lower alkyl radical or chloro lower alkyl radical.

These organic dithiophosphate compounds have pesticidal properties and distinguish themselves from known pesticidal compounds in being more toxic at low concentrations toward certain pests and in having a much longer residual toxicity toward mites when sprayed on plants normally attacked by such pests.

The organic dithiophosphate compounds of this invention are made by reacting dichloro-1,4,5,8-tetraoxaoctahydronaphthalene or dibromo-1,4,5,8-tetraoxaoctahydronaphthalene with the desired diester of dithiophosphoric acid, the latter being the product of reaction of a lower aliphatic alcohol or a mixture of lower aliphatic alcohols of the formula ROH and $P_2S_5$. The diester of dithiophosphoric acid may be reacted directly with the dihalo-1,4,5,8-tetraoxaoctahydronaphthalene or it may be reacted in the form of its salt or in the presence of materials which sequester the hydrogen halide set free in the reaction.

The methods of making the products of this invention and methods of using the products as pesticides are more particularly described in the following examples in which all parts and percentages are by weight.

Example 1

1,4,5,8 - tetraoxaoctahydronaphthalene was prepared by the methods of Rec. trav. chim. 50, 909 (1931) and J. Chem. Soc. 86, (1932).

*Chlorination.* — 35 parts 1, 4, 5, 8 - tetraoxaoctahydronaphthalene (M. P. 80–125° C.) was dissolved in 160 parts carbon tetrachloride. Chlorine gas was passed into this solution at the rate of about 30 parts per hour in the presence of ultraviolet light. The chlorine efficiency was close to 100%. After about 60 parts chlorine had reacted, the solvent was distilled off at reduced pressure to give 52 parts viscous yellow liquid of 33.9% chlorine content (33.0% chlorine calculated for dichloro-1,4,5,8-tetraoxaoctahydronaphthalene).

To a stirred solution of 43 parts O,O-diethyl dithiophosphoric acid in about 120 parts benzene was added 16.6 parts pyridine in 120 parts benzene at 30–40° C. The resulting salt solution was then added dropwise to 21.5 parts dichloro-1,4,5,8-tetraoxaoctahydronaphthalene prepared as above while heating at 50° C. The mixture was then heated at 80° C. for 4 hours during which time pyridine hydrochloride separated. At the end of this time, water was added to dissolve the water-soluble salts and the organic layer was dissolved in ether and further purified by washing first with 5% aqueous potassium hydroxide solution and then with water. After drying over sodium sulfate, the solution ether and benzene were removed under reduced pressure and the residue was topped at 60° C./0.5 mm. The residue, which was the bis(diethyl dithiophosphate) of 1,4,5,8-tetraoxaoctahydronaphthalene dithiol, also designated 1,4,5,8-tetraoxaoctahydronaphthalene dithiol S,S-bis (O,O-diethylphosphorodithioate), amounted to 26.5 parts and had the following analysis: S, 21.1%; P, 11.2%; (calcd. for the designated ester): S, 25.0%; P, 12.1%.

An emulsifiable concentrate of the residue was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results tabulated below.

Tests showed that a 0.05% emulsion of the composition of this example produced a 100% kill of pea aphids when sprayed on pea plants infested with pea aphids, a 100% kill of two-spotted mites when sprayed on lima bean seedlings infested with two-spotted mites, and a 100% kill of Mexican bean beetles when sprayed on lima bean seedlings infested with Mexican bean beetles. Residual toxicity of the plants toward further infestation was also excellent.

Tests as an insecticide against houseflies showed 100% kill using a 0.1% solution of the emulsion.

Example 2

O,O-di-n-propyl dithiophosphoric acid was produced by adding four molecular equivalents of anhydrous n-propyl alcohol to a suspension of one molecular equivalent of phosphorus pentasulfide ($P_2S_5$) suspended in benzene while heating under reflux and venting the hydrogen sulfide evolved. The temperature was gradually raised to 100° C. during the course of this addition and heating was stopped when hydrogen sulfide evolution ceased. The product was cooled and filtered and the solvent was removed at 80° C. under 15 mm. pressure.

Dichloro-1,4,5,8-tetraoxaoctahydronaphthalene having 33.8% chlorine was prepared by chlorination of 1,4,5,8-tetraoxaoctahydronaphthalene as in Example 1.

To 30 parts of O,O-di-n-propyl dithiophosphoric acid in about 160 parts benzene was added 10.8 parts pyridine at 30–40° C. To the resulting solution was then added 14 parts dichloro-1,4,5,8-tetraoxaoctahydronaphthalene and the mixture was refluxed for 4 hours. The resulting mixture was cooled, dispersed in commercial octane and washed with about 200 parts 15% sodium chloride solution, with dilute sodium carbonate, and then with 15% aqueous sodium chloride solution and finally dried over sodium sulfate. After removal of the solvents by distillation, a residue of bis(di-n-propyl dithiophosphate) of 1,4,5,8 - tetraoxaoctahydronaphthalenedithiol amounting to about 30 parts was isolated. It analyzed 18.8% S and 9.2% P.

It was made into an emulsifiable concentrate by mixing 1 gram of the residue with 1 ml. benzene and 1 ml. sorbitan monolaurate polyoxyalkylene derivative (Tween 20). This concentrate was then diluted with water to form dispersions of the residue in water of concentrations from 1% to 0.00025%. Toxicity data using the compound of this example showed 100% kill of Mexican bean beetles on pea plants with a 0.05% solution, and 70% kill of two-spotted mites with a 0.1% emulsion.

*Example 3*

Bis(β-chloroethyl) dithiophosphoric acid was prepared by the reaction of β-chloroethyl alcohol on phosphorus pentasulfide and was then reacted with dichloro-1,4,5,8-tetraoxaoctahydronaphthalene in benzene solution to produce the bis(β-chloroethyl dithiophosphate) of 1,4,5,8-tetraoxaoctahydronaphthalenedithiol. This product was then made into a concentrate with benzene and Tween 20 and diluted to emulsions of various concentrations. These emulsions were shown to have high toxicity to two-spotted mites both by contact and by treating plants on which the insects and mites normally live.

*Example 4*

Di-n-butyl dithiophosphoric acid was prepared by the reaction of n-butyl alcohol on phosphorus pentasulfide and was then reacted with dichloro-1,4,5,8-tetraoxaoctahydronaphthalene in benzene solution in the presence of pyridine to produce the bis(di-n-butyl dithiophosphate) of 1,4,5,8 - tetraoxaoctahydronaphthalenedithiol. This product was then made into a concentrate with benzene and Tween 20 and diluted to emulsions of various concentrations. These emulsions were shown to have toxicity to insects and mites both by contact and by treating plants on which the insects and mites normally live.

*Example 5*

Diisopropyl dithiophosphoric acid was prepared by the action of isopropyl alcohol on phosphorus pentasulfide and was then reacted with dichloro-1,4,5,8-tetraoxaoctahydronaphthalene in benzene solution to produce the bis-(diisopropyl dithiophosphate) of 1,4,5,8-tetraoxaoctahydronaphthalenedithiol. This product was then made into a concentrate with benzene and Tween 20 and diluted to emulsions of various concentrations. These emulsions were shown to have high toxicity to pea aphids both by contact and by treating plants on which the insects and mites normally live.

The organic dithiophosphate compounds of the formula

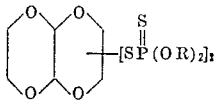

are those in which each R is the same or a different organic radical such as a lower alkyl radical: methyl, ethyl, n-propyl, isopropyl, isobutyl, sec-butyl and n-butyl, and halogen substituted lower alkyl radicals. In the above definition of the scope of the compounds of this invention, "lower alkyl" is defined to include those alkyl radicals with 1 to 4 carbon atoms.

In producing the compounds of this invention the reaction between the dichloro-1,4,5,8-tetraoxaoctahydronaphthalene or dibromo-1,4,5,8-tetraoxaoctahydronaphthalene and the ester of dithiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction is preferably carried out in nonaqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the dihalo-1,4,5,8-tetraoxaoctahydronaphthalene, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the dihalo-1,4,5,8-tetraoxaoctahydronaphthalene. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the dihalo-1,4,5,8-tetraoxaoctahydronaphthalene, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the dihalo-1,4,5,8-tetraoxaoctahydronaphthalene.

The methods by which the products of this invention are isolated will vary slightly with the reactants used and the product produced. In some instances the chloride salt split out in the reaction separates and can be filtered off. In other instances the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agents in pesticidal formulations or in admixture with other toxicants for modification of the properties of the individual toxicants. They may be used, for example, in admixture with toxaphene, DDT, thanite, chlordane, rotenone, pyrethrin, and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants from the propellant vehicle.

Aqueous dispersions are made up from the compounds of this invention, a surface active dispersing agent, and water as the essential ingredients. The amount of the compounds of this invention in the aqueous dispersions when diluted for spraying of plants will be in the range of 10.0% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface active dispersing agent. The concentrate may also contain sufficient organic solvents to aid in effective dispersion. The amount of surface active dispersing agent used is usually at least 5% of the amount of toxic compound in the concentrate.

Suitable surface active dispersing agents for use in the compositions of this invention are those disclosed in Chemistry of Insecticides, Fungacides, and Herbicides (Donald E. H. Frear, second edition, 1948, pages 280–287) for use with known insecticides and include neutral soaps or resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface active dispersing agents which are useful in the compositions of this invention are the omega-substituted polyethylene glycols of relatively long-chain length, particularly those in which the omega substituent is aryl, alkyl, or acyl. Compositions of the toxic material and surface active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

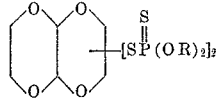

in which each R represents a radical selected from the group consisting of lower alkyl and chloro lower alkyl.

2. As a new composition of matter a compound of the formula

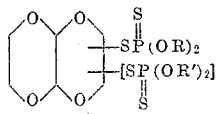

in which R and R' represent different radicals selected from the group consisting of lower alkyl and chloro lower alkyl.

3. As a new composition of matter a compound of the formula

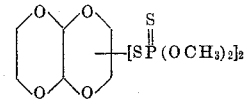

4. As a new composition of matter a compound of the formula

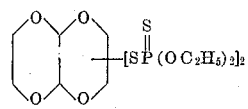

5. As a new composition of matter a compound of the formula

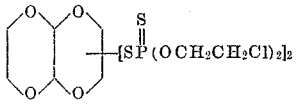

6. A pesticidal composition comprising the compound of claim 1 and an insecticidal adjuvant.

7. A pesticidal composition comprising the compound of claim 2 and an insecticidal adjuvant.

8. A pesticidal composition comprising the compound of claim 3 and an insecticidal adjuvant.

9. A pesticidal composition comprising the compound of claim 4 and an insecticidal adjuvant.

10. A pesticidal composition comprising the compound of claim 5 and an insecticidal adjuvant.

References Cited in the file of this patent

FOREIGN PATENTS 885,176    Germany _____ Aug. 3, 1953